US010789313B2

(12) United States Patent
Tripathi et al.

(10) Patent No.: US 10,789,313 B2
(45) Date of Patent: Sep. 29, 2020

(54) METHOD AND SYSTEM FOR EXTRACTING INFORMATION RELATED TO PRODUCT

(71) Applicant: Innoplexus AG, Eschborn (DE)

(72) Inventors: Gaurav Tripathi, Pune (IN); Sanchit Aggarwal, Ghaziabad (IN); Gunjan Bhardwaj, Taunus (DE)

(73) Assignee: Innoplexus AG, Eschborn (DE)

( * ) Notice: Subject to any disclaimer, the term of this patent is extended or adjusted under 35 U.S.C. 154(b) by 204 days.

(21) Appl. No.: 15/855,941

(22) Filed: Dec. 27, 2017

(65) Prior Publication Data

US 2018/0285464 A1 Oct. 4, 2018

Related U.S. Application Data

(60) Provisional application No. 62/479,220, filed on Mar. 30, 2017.

(51) Int. Cl.
*G06F 16/00* (2019.01)
*G06F 16/9535* (2019.01)
*G06F 16/958* (2019.01)
*G06F 16/22* (2019.01)
*G06F 16/33* (2019.01)
*G06Q 30/06* (2012.01)

(52) U.S. Cl.
CPC ...... *G06F 16/9535* (2019.01); *G06F 16/2246* (2019.01); *G06F 16/3344* (2019.01); *G06F 16/958* (2019.01); *G06Q 30/0623* (2013.01)

(58) Field of Classification Search
CPC ............ G06F 16/3344; G06F 16/2246; G06F 16/958; G06F 16/9535; G06Q 30/0623; G06Q 30/0631
See application file for complete search history.

(56) References Cited

U.S. PATENT DOCUMENTS

| 8,515,828 | B1 * | 8/2013 | Wolf | G06Q 30/02 |
| | | | | 705/26.1 |
| 9,710,456 | B1 * | 7/2017 | Mengle | G06F 17/2785 |
| 10,061,767 | B1 * | 8/2018 | Mengle | G06F 17/278 |
| 2011/0208669 | A1 * | 8/2011 | Ruhl | G06Q 30/02 |
| | | | | 705/347 |
| 2012/0158735 | A1 * | 6/2012 | Ruhl | G06Q 30/02 |
| | | | | 707/741 |

* cited by examiner

*Primary Examiner* — Cheryl Lewis
(74) *Attorney, Agent, or Firm* — Ziegler IP Law Group, LLC

(57) ABSTRACT

A method of extracting information related to a product. The method includes receiving web-content aggregated from at least one data source related to a subject matter, wherein the web-content comprises data related to the product associated with the subject matter; analyzing the data to determine at least one snippet of text associated with the product; processing the at least one snippet of text to generate at least one dataset associated with the product, wherein the at least one dataset is stored in a data corpus; analyzing the at least one snippet of text to determine a user perspective related to the product; and extracting the information related to the product by mapping the at least one dataset associated with the product and the user perspective related to the product.

20 Claims, 2 Drawing Sheets

METHOD AND SYSTEM FOR EXTRACTING INFORMATION RELATED TO PRODUCT

CROSS REFERENCE TO RELATED APPLICATIONS

This application claims priority to U.S. Provisional Patent Application No. 62/479,220, filed Mar. 30, 2017, which is hereby incorporated by reference in its entirety.

TECHNICAL FIELD

The present disclosure relates generally to service industry; and more specifically, to information system. Furthermore, the present disclosure also relates to extraction of data related to a product. Moreover, the present disclosure also relates to computer readable medium containing program instructions for execution on a computer system, which when executed by a computer, cause the computer to perform method steps for extracting information related to product.

BACKGROUND

With regard to innovation and development in technological field, information system has also developed rapidly. Such rapid development of the information system has enabled users to extract variety of information from numerous sites. This enables the users to make more informed decisions, for example, users can extract information associated with a product such as a drug prior to purchasing and/or using the product. The user visits the numerous sites in order to extract information associated with the product. Furthermore, such sites may be review sites, blogs, official sites, social networking sites and so forth.

However, conventional methods of extract information associated a product includes a number of problems. For example, the sites providing such information about the product may be unorganized and may also contain redundant and repeated information. Additionally, extracting information from such unorganized sites require manual labour from the users. Therefore, a lot of user's time is wasted in looking for a piece of information such as general opinion regarding use of the product. Moreover, such sites may not include all information associated with the product. Therefore the users may not be able to make an appropriate decision with respect to the product. Furthermore, the users visiting such sites may be vulnerable to misinterpret information provided on the sites. In an example, a user may confuse a drug for lowering bad cholesterol named "Advicor" with "Advair" that is a drug for asthma. Such misinterpretation of extracted information may lead to undesirable consequences. Consequently, extracting information from such sites may be inefficient and inadequate for the users in order to make an optimal decision. Furthermore, such an approach of extracting information may not provide a transparent view of general opinion associated with the product.

Therefore, in light of the foregoing discussion, there exists a need to overcome the aforementioned drawbacks associated with acquiring an opinion and information associated with the product.

SUMMARY

The present disclosure seeks to provide a method of extracting information related to a product. The present disclosure also seeks to provide a system for extracting information related to a product. The present disclosure seeks to provide a solution to the existing problem of acquiring an opinion and information associated with the product. An aim of the present disclosure is to provide a solution that overcomes at least partially the problems encountered in the prior art, and provides an efficient means of acquiring and providing an opinion and information associated with the product.

In a first aspect, an embodiment of the present disclosure provides a method of extracting information related to a product, the method comprising:
- receiving web-content aggregated from at least one data source related to a subject matter, wherein the web-content comprises data related to the product associated with the subject matter;
- analyzing the data to determine at least one snippet of text associated with the product;
- processing the at least one snippet of text to generate at least one dataset associated with the product, wherein the at least one dataset is stored in a data corpus;
- analyzing the at least one snippet of text to determine a user perspective related to the product; and
- extracting the information related to the product by mapping the at least one dataset associated with the product and the user perspective related to the product.

In a second aspect, an embodiment of the present disclosure provides a system for extracting information related to a product, the system comprising:
- a processing module operable to:
  - receive web-content aggregated from at least one data source related to a subject matter, wherein the web-content comprises data related to the product associated with the subject matter;
  - analyze the data to determine at least one snippet of text associated with the product;
  - process the at least one snippet of text to generate at least one dataset associated with the product, wherein the at least one dataset is stored in a data corpus;
  - analyze the at least one snippet of text to determine a user perspective related to the product; and
  - extract the information related to the product by mapping the at least one dataset associated with the product and the user perspective related to the product;
  and
- a database arrangement communicably coupled to the processing module, wherein the database arrangement is configured to store the extracted information related to the product.

In a third aspect, an embodiment of the present disclosure provides a computer readable medium containing program instructions for execution on a computer system, which when executed by a computer, cause the computer to perform method steps for extracting information related to a product, the method comprising the steps of:
- receiving web-content aggregated from at least one data source related to a subject matter, wherein the web-content comprises data related to the product associated with the subject matter;
- analyzing the data to determine at least one snippet of text associated with the product;
- processing the at least one snippet of text to generate at least one dataset associated with the product, wherein the at least one dataset is stored in a data corpus;
- analyzing the at least one snippet of text to determine a user perspective related to the product; and extracting the information related to the product by mapping the at least one dataset associated with the product and the user perspective related to the product.

Embodiments of the present disclosure substantially eliminate or at least partially address the aforementioned problems in the prior art, and enables to extract an opinion and information related to a product.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
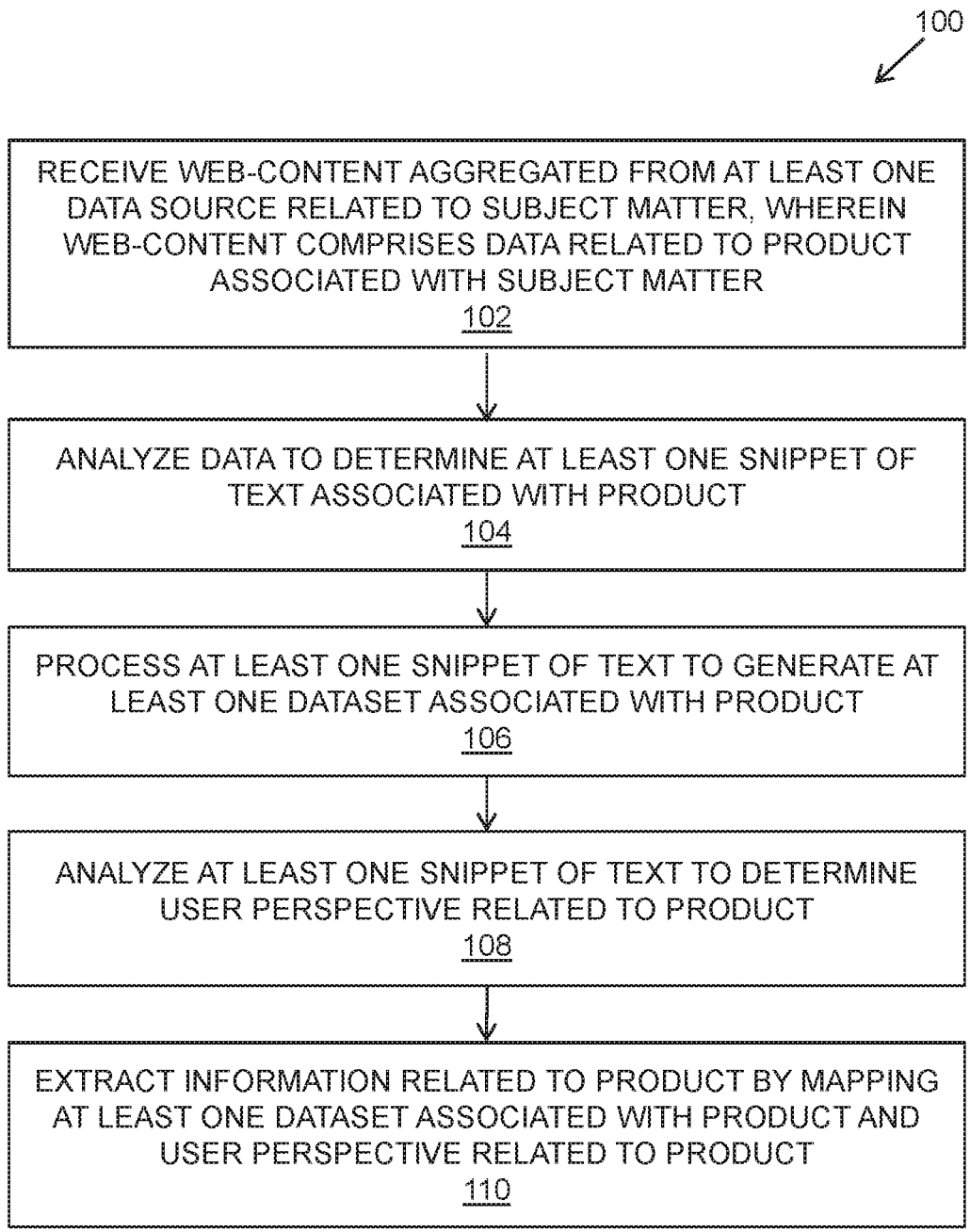
FIG. 1 is an illustration of steps of a method of extracting information related to a product, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method of extracting information related to a product, the method comprising:

receiving web-content aggregated from at least one data source related to a subject matter, wherein the web-content comprises data related to the product associated with the subject matter;

analyzing the data to determine at least one snippet of text associated with the product;

processing the at least one snippet of text to generate at least one dataset associated with the product, wherein the at least one dataset is stored in a data corpus;

analyzing the at least one snippet of text to determine a user perspective related to the product; and extracting the information related to the product by mapping the at least one dataset associated with the product and the user perspective related to the product.

In another aspect, an embodiment of the present disclosure provides a system for extracting information related to a product, the system comprising:

a processing module operable to:

receive web-content aggregated from at least one data source related to a subject matter, wherein the web-content comprises data related to the product associated with the subject matter;

analyze the data to determine at least one snippet of text associated with the product;

process the at least one snippet of text to generate at least one dataset associated with the product, wherein the at least one dataset is stored in a data corpus;

analyze the at least one snippet of text to determine a user perspective related to the product; and extract the information related to the product by mapping the at least one dataset associated with the product and the user perspective related to the product;

and a database arrangement communicably coupled to the processing module, wherein the database arrangement is configured to store the extracted information related to the product.

The present disclosure provides the method and the system for extracting information related to a product. The method enables effective and reliable aggregation of information and opinion associated with the product. The method enables efficient means of grouping (namely, mapping) the information and opinion associated with the product. Beneficially, such efficient means enables a user to readily interpret and decide whether or not to acquire and/or use the product. Furthermore, the extracted information includes terms and words that describes the product. Beneficially, such terms and words enable the user to gather facts about the product that may not be readily available. Additionally, the extracted information provided to the user is verified and normalized using data that are considered as standard in subject matter of the product. Moreover, the information related to the product enables the user to understand the perspective of other user of the product. Therefore the user can perform an informed decision with respect to the product.

The system for extracting information related to a product (such as an item that can be acquired and used by a user) relates to an arrangement including programmable and/or non-programmable components that is configured to identify, extract and provide a set of data that describes the product. The system includes a processing module that is operable to extract information related to the product. Throughout the present disclosure, the term "processing module" used herein relates to a computational element that is operable to process and respond to instructions for extracting information related to the product. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term processing module refers to one or more individual processors, processing devices and various elements associated with a processing device that may be shared by other processing devices. Additionally, the one or more individual processors, processing devices and elements are arranged in various architectures for responding to and processing the instructions that drive the system. The processing module is configured to generate the information related to the product in a manner that convenient for the user to recognize facts related to the product. In an example, facts related to the product can include benefits, side effects, warnings, precautions of using the product, public opinion of the product and the likes.

Optionally, the processing module is operatively coupled with a communication interface. The communication interface enables the processing module to extract information related to the product. Furthermore, the communication interface enables an exchange of data between a database arrangement and the processing module. The communication interface relates to an arrangement of interconnected programmable and/or non-programmable components that are configured to facilitate data communication between one or more electronic devices, software modules and/or databases, whether available or known at the time of filing or as later developed. Additionally, the communication interface includes wired or wireless communication that can be carried out via any number of known protocols, including, but not limited to, Internet Protocol (IP), Wireless Access Protocol (WAP), Frame Relay, or Asynchronous Transfer Mode (ATM).

The processing module is operable to receive web-content aggregated from at least one data source related to a subject matter. The processing module is configured to browse the World Wide Web (referred to, herein later as "web") for accessing web-content. Throughout the present disclosure, the term "web-content" relates to content accessible over the web, or over other portions of the Internet. Furthermore, the content broadly refers to one or more documents, files, scripts, codes, executable programs, web pages or any other digital data that can be transmitted via a network (such as the Internet). Optionally, the web-content relates to data associated with the at least one data source (such as a webpage) accessed by the programmable and/or non-programmable components of the system whilst browsing the web. Optionally, the web-content is associated with the at least one data source can include various web-based contents, such as, HTML content. Throughout the present disclosure, the term "data source" relates to resources such as web site, a web page, or other item of interest accessible on the web adapted to serve web-content using any internetworking protocols, and is not intended to be limited to content uploaded or downloaded via the Internet or the Hyper Text Transfer Protocol (HTTP). Furthermore, the term "subject-matter" as used herein, relates to a specific field or topic (namely, domain). For example, the specific field or topic may be computers, bio-technology, life science, medical science, pharmaceuticals and the like. Therefore, the at least one data source related to a subject matter relates to resources accessible on the web that provides web-content related to a specific field or topic. In an example, at least one data source related to a subject matter may include a website for a pharmaceuticals product. In such example, the web-content included in the website comprise digital data having text, image, hyperlinks and the like, that describe the pharmaceuticals product.

Optionally, the receiving web-contents by the processing module further comprises crawling the at least one data source for receiving the web-content. The processing module includes the executable programs configured to perform a specific task, such as extracting web-content from the at least one data source, namely a web resource (for example, website, webpage and the likes). Optionally, the executable programs preferably refer to a computer program that is configured to automate a computing task that would otherwise be performed manually. In an example, the executable program is a bot (or spider) that is configured to autonomously browse the web to extract web-content. Optionally, the web crawling is performed in a manner wherein the processing module is configured to execute the executable programs using one or more individual processors, processing devices and units. Furthermore, the one or more individual processors, processing devices and units are arranged in various architectures. Moreover, the one or more individual processors, processing devices and units are configured to process and respond to instructions included in the executable programs to perform web crawling. Optionally, the web crawling module is implemented in a distributed architecture. In the event wherein the web crawling module is implemented in the distributed architecture, the programs (such as the bots and/or spiders) for browsing the web are configured to be hosted on one or more computing hardware that are spatially separated from each other. Optionally, crawling the at least one data source includes acquiring the web-content associated with the data source. In an example, the web-content acquired by crawling the data source such as a website may include text, web forms, hyperlinks, metadata of the website, and likes. The web-content crawled from the at least one data source are aggregated and provided to the processing module. Optionally, aggregating the web-content included organizing the extracted web-content. Furthermore, the aggregation includes a number of functions that are performed on the extracted web content. Optionally, the functions performed on the extracted web-content include parsing, cleansing, normalizing, transforming, formatting, and classifying data in the web content. Optionally, the aggregation of the web-content is a topic-based aggregation. The topic-based aggregation includes organizing the web-content related to a subject-matter (such as pharmaceuticals).

The web-content comprises data related to the product associated with the subject matter. The data related to the product refers to any digital content included in the web-content that describes the product. The digital content that describes the product includes text, image, hyperlinks and the like. For example, the digital content may be a sentence such as "A pharmaceutical drug 'X' for treating headache". In such example, the digital content (such as the sentence) is related to a product (such as the drug 'X') which is associated with a pharmaceutical subject matter. In such example, the sentence is capable of describing a property of the drug 'X', i.e. use of the drug 'X' for treating headache.

The processing module is operable to analyse the data to determine at least one snippet of text associated with the product. The analysing the data relates to a method of extracting contextual and/or syntactical meaning from the data and/or combining the data into a new representation. Furthermore, the analysing the data also relates to organising the data that includes removing redundancies in the data, linguistic errors and the likes. Optionally, analysing the data can include removal of items (such as individual and/or group of terms, words phrases and the like) included in the data such as Uniform Resource Locator (URL) and special characters. For example, the data may be a sentence such as, "The pharmaceutical drug 'X' for treating headache, www.xyz.com, # not-helpful". In such example, analyzing the data may include removing the Uniform Resource Locator (URL) such as "www.xyz.com", and special character such as "#" for the sentence. Furthermore, the removal of items such as Uniform Resource Locator (URL) and special characters can be achieved by comparing the items of the data with libraries and programs for symbolic and statistical natural language processing, for example libraries and programs of Natural Language Toolkit®. Optionally, the analysing the data can include recognising typographical errors and perform rectification thereof. For example, the data may be a sentence such as, "The pharmaceutical drug 'Y' for treating callous". In such example, analyzing the data may include recognising typographical error associated with the use of the term "callous" and replacing the same with the term "callus" in the sentence. Furthermore, recognising and rectification of the typographical errors in the data (such as the sentence) can be achieved by using an application program that flags miss-spelled words and replaces the same with an appropriate word. Additionally, such application programs can be configured to operate as stand-alone, capable of operating on a block of text, or as part of a larger application (such as the system), for example, Peter Norwig's spell check tool. Optionally, the analysing the data can include removal of stop words from the data. For example, the data may be a sentence such as, "The pharmaceutical drug 'Y' is used for treating callous". In such example, analyzing the data may include identifying the stop words in the sentence, namely, "the" and "is". Furthermore, the removal of stop words from the data can be achieved by using libraries and programs for symbolic and statistical natural language processing, for example common English stop words list of Natural Language Toolkit®. Additionally, the removal of stop words comprises making a bag of words model of the text in the data and arranging the bag in descending order of frequency, and removing irrelevant words with very high frequency. Optionally, analysing the data can include determining part of speech tagging. For example, the data may be text such as a sentence. The part of speech tagging includes identifying elements such as adjectives, nouns and verbs in the data. Optionally, analyzing the data can include stemming of the data. For example, the verbs in the data (such as the sentence) may be removed. Optionally, the part of speech tagging can be used to determine a contextual meaning from the data. Optionally, the analyzing of data can include tokenization and word sense tagging. Optionally, the analysis of the data can be performed in a specific manner. For example, a first step of analyzing the data may include tokenization of the data, a second step of analyzing the data may include stemming of the data, a third step of analyzing the data may include tagging parts of speech in the data, a forth step of analyzing the data may include removing the Uniform Resource Locator (URL) from the data, a fifth step of analyzing the data may include removal of stop word from the data, a sixth step of analyzing the data may include removing typographical errors from the data, a seventh step of analyzing the data may include removing special character from the data, and an eighth step of analyzing the data may include word sense tagging of the data. Optionally, the analyses of the data can be performed by one more algorithms and/or methods that excludes the aforesaid method, such as tokenization, stemming, removing the Uniform Resource Locator and the likes.

At least one snippet of text associated with the product is determined by analysing the data. Throughout the present disclosure, the term "snippet of text" relates to a portion of the data related to the product that is generated by analyzing the data included in the web-content. The at least one snippet of text include one or more expressions (such as terms/words) that describes the product. The at least one snippet of text is a collections of one or more expressions generated by extracting most important expressions from the data. It will be appreciated that the analysis of the data is configured to removes the redundant expressions (such as terms/words) in the data and thereby provides the most important expressions in the data. For example, the data may be a sentence such as, "The pharmaceutical drug 'X' for treating headache, www.xyz.com, # not-helpful". In such example, at least one snippet of text may include "drug 'X' treating headache not-helpful".

The processing module is operable to process the at least one snippet of text to generate at least one dataset associated with the product, wherein the at least one dataset is stored in a data corpus. The dataset includes facts associated with the product that are arranged within the data corpus. The dataset is generated by extracting the facts associated with the product. The dataset includes items (facts associated with the product) that are interrelated to each other. Optionally, the at least one dataset comprises the terms describing at least one attribute of the product. Furthermore, terms describing the product include the type of the product, such as name of the product, the composition of the product, such as ingredients used to manufacture the product, and the nature of use of the product, such as the type of side effects caused by the product. Optionally, the dataset comprises the at least one feature related to the product. Furthermore, at least one feature includes the effects associated with the product. For example, the product is a pharmaceutical drug. In such an example, the effect may be an undesirable effect of using the drug, namely irritation. Optionally, the dataset comprises the at least one trait of the product. Furthermore, the at least one trait includes one or more symptoms and indications associated with usage of the product. For example, the product is a pharmaceutical drug. In such an example, the symptoms and indications are associated with diseases that may be treated by the pharmaceutical drug.

Optionally, the processing module is operable to generate a data structure comprising at least one record related to the product. The processing of the at least one snippet of text relates to a computational process that involves rearranging the at least one snippet of text in specific format (data structure). The computational process comprises a sequence of steps to be performed by a program when executed via the processing module. The program is configured to transform the at least one snippet of text associated with the product is a data structure that describes the product. Throughout the present disclosure, the term "data structure" relates to a way of organizing data (such as the at least one snippet of text) in a predetermined fashion. Optionally, the data structure can include data structures that are language provided (e.g., integers, real numbers, character strings, etc.) and data structures that are user defined and application specific. Optionally, the data structure generated from the at least one snippet of text is a JavaScript Object Notation (JSON) data structure. Beneficially, the JavaScript Object Notation (JSON) data structure is used for providing serialized structured data. The data structure includes one or more fields arranged in sequence for storing different data types. The one or more fields are configured to include at least one record related to the product. The at least one record refers to a property that define the product. For example, the properties of a product may include name of the product, a serial number associated with the product, and the likes.

Optionally, the at least one record comprises terms associated with at least one attribute of the product. The at least one attribute of the product relates to an aspect of the product. For example, the at least one attribute of a product may be an aspect of the drug of being capable of avoiding allergies. In such example, at least one record may include a term, namely anti-allergic, that describe the at least one attribute of the product of being capable of avoiding allergies. Therefore, the terms associated with the at least one attribute of the product are capable of describing aspects of the product. Optionally, the at least one attribute of the product comprises a type of the product, i.e. terms associated with at least one attribute of the product are capable of describing a category of the product. For example, terms, namely reduce pain, may be associated with a product, namely a drug 'G'. In such example, the terms describes that the drug 'G' belongs to a category of drugs, namely analgesic. Furthermore, the type of the product is described using terms that can include standard and/or non-standard terms related to the subject matter to which the product belongs. Optionally, the at least one attribute of the product comprises a composition of the product, i.e. terms associated with the at least one attribute of the product are capable of describing elements (such as ingredients, parts, building blocks and the likes) used for creating the product. For example, a product, namely the drug 'G', may have terms, namely drug include paracetamol, associated therein. In such example, the terms associated therein describes that paracetamol is an ingredient in the composition of the drug 'G'. Optionally, the at least one attribute of the product comprises nature of use of the product, i.e. terms associated with at least one attribute of the product is capable of describing one or more suggestions associated with the uses of the product and one or more precautions for describing the product. For example, the terms associated with the product, namely the drug 'G', may include effects of using the drug in multiple scenarios. In such example, multiple scenarios may include effect of overdosing the drug, general adverse effect of the drug, effect of the drug when consumed during pregnancy. In another example, the terms associated with the product, namely the drug 'G', may describe precautions in using the product, such as the terms may provide a precaution of using the drug 'G' only when prescribed by a doctor. Optionally, the at least one record may include attributes other than the aforesaid attributes.

The at least one record is arranged within the data structure based on a hierarchy. The hierarchy includes arranging the at least one record of the product details in a manner that a relation can be drawn from the data structure. The hierarchy of arranging the at least one record can be implemented in to replicate a real world hierarchy. For example, the at least one record arranged within the data structure may be related to a product namely the drug 'G'. In such example, the hierarchy of the data structure may replicate a drug label, such as a drug label described by Food and Drug Administration (FDA) of United States.

The processing module is operable to process the at least one snippet of text to generate a data corpus comprising at least one section. Throughout the present disclosure, the term "data corpus" relates to a collection of information wherein processes related to the system can regularly add information related to products acquired from web crawling and/or other routines. The data corpus is a domain of information that includes methods, data structures, and apparatuses described therein and that can be organized in a flexible way. The corpus of data can have a fixed volume or it can comprise streaming data. Furthermore, the data corpus can include one or more set of information and each set of information comprises one or more items. Moreover, each set of information of the one or more sets of information can refer to a portion of the data corpus describing one or more products based on one or more attributes and/or delimiters. Optionally, the set of information can include various types of data-type, such as text-like data, categorical data, numerical data, structured data, unstructured data, or any other type of data.

The at least one section included in the data corpus relates to a portion of the data corpus that categorizes the set of information related to the product. Furthermore, the categorization of the product is based on the subject matter associated in the product. For example, a product may be a drug related to the pharmaceutical subject matter. In an example, the categorization of the information related to the drug may be categorized in at least one section that is a standard in pharmaceuticals. In such an example, the at least one sections may include twenty sections that is defined by the Food and Drug Administration (FDA) of United States for categorizing information related to the drug.

Optionally, the at least one section is associated with at least one characteristics of operation of the product. The characteristics of operation of the product relates to reaction of the product when used in a specific manner. For example, the product is a pharmaceutical drug used as a painkiller. In such example, at least one section may be related to the warning associated with using the product. In such example, the warning may describe that the use of the pharmaceutical drug on a patient may cause fatigue, depigmentation. Optionally, the at least one characteristics of operation of the product comprises a nature of operation of the product. The nature of operation of the product relates to the aspect of the product that describes how the product operates when used. Therefore, the at least one section that is associated with the nature of operation of the product is operable to suggest that how the product operates when used. For example, the product may be a pharmaceutical drug 'V'. In an example, the the at least one section may be related to instruction for use of the pharmaceutical drug 'V'. In such an example, the at least one section may include information (terms) related to how and/or when the pharmaceutical drug 'V' should be administered to a patient. Optionally, the at least one characteristics of operation of the product comprises a nature of effects caused by using the product. The nature of effects caused by using the product relates to aspect of the product that describes consequence of using the product. Therefore, the at least one section that is associated with the nature of effects caused by using the product is operable to suggest the consequence of using the product. For example, the product may be a pharmaceutical drug 'V'. In an example, the the at least one section may be related to adverse reactions of using the pharmaceutical drug 'V'. In an example, the the at least one section may include information (terms) that describe the side effects of using the drug. Optionally, the at least one characteristic of operation of the product comprises a condition associated with use of the product. The condition associated with use of the product relates to aspect of the product that describes the prerequisites for using the product. Therefore, the at least one section that is associated with the condition associated with use of the product is operable to suggest the prerequisites for using the product. For example, the product may be a pharmaceutical drug 'V'. In an example, the the at least one section may be related to contraindications of using the pharmaceutical drug 'V'. In such an example, the the at least one section may include information (terms) that describes a prerequisite, namely anemia for using the pharmaceutical drug 'V'.

The data corpus is generated by arranging the at least one record within the at least one section. Specifically, the terms that describe the at least one attribute included in the at least one record are arranged within the at least one section of the data corpus. The terms are arranged within the at least one section based on the relevance and validity. For example, an attribute of the product, namely pharmaceutical analgesic drug 'O', is that it provides "pain-relief", another attribute of the drug 'O' is that it is causes "irritation" when used. In an example, the data corpus may include sections, namely "instruction for use" and "adverse reaction". In such an example, arranging the at least one record within the at least one section may include associating the term "pain-relief" with the sections, namely "instruction for use", and associating the term "irritation" with the section namely "adverse reaction".

Optionally, the arranging the at least one record by the processing module further comprises validating the terms associated with the at least one attribute of the product, with terms acquired from a first external data source, wherein the first external data source comprises standard terms related to the subject matter associated with the product. Throughout the present disclosure, the term "first external data source" used herein relates to a collection of one or more hardware, software, firmware, or a combination of these, configured to store, process and/or share data with the aforesaid system. Optionally, the first external data source is a data repository that is intended to be construed broadly so as to encompass, by way of example and without limitation, a computer-based device used for storing data. Furthermore, the data stored by the first external data source is data related to the subject matter. It will be appreciated that the first external data source is operable to store data related to a subject matter associated with the product. For example, the subject matter associated to a product, namely an analgesic drug, is pharmaceuticals. In such example, the first external data source may be a data repository that includes Medical Dictionary for Regulatory Activities. In such example, the data repository may include standard terms related to pharmaceuticals. Therefore, the the processing module can access the first external data source to acquire standard terms related to pharmaceuticals for comparing the terms associated with the at least one attribute of the product. Optionally, the arranging the at least one record by the processing module further comprises augmenting the at least one section of the data corpus with at least one feature related to the product acquired from a second external data source. Optionally, the second external data source is similar to the first external data source in a manner that the second external data source refers to a data repository that includes a collection of one or more hardware, software, firmware, or a combination of these, configured to store, process and/or share data with the aforesaid system. Furthermore, the second external data source includes information related to the effects of the product. For example, second external data source may include information related to a pharmaceutical drug 'F'. In such an example, the information related to a pharmaceutical drug 'F' may include the side effects of the drugs. In an example, the processing module is operable to access the second external data source to access the side effects associated with the pharmaceutical drug 'F'. In another example, the side effects associated with the pharmaceutical drug 'F' acquired is thereafter store in the data corpus with an appropriate section. In yet another example, the appropriate section for storing the side effects associated with the pharmaceutical drug 'F' may be "adverse reaction" section. Optionally, the arranging the at least one record by the processing module further comprises augmenting at least one section of the data corpus by acquiring at least one trait of the product and a similar product. The processing module is operable to acquire information related to the at least one trait of the product and a similar product by crawling one or more web-source that includes a web site, a web page, or other item of interest accessible on the web adapted to serve web-content using any internetworking protocols. Furthermore, the web-content acquired from the web-source is processed to determine one or more traits and similar product associated with the products. It will be appreciated that processing of the web-content acquired from the web-source is similar to the aforementioned processing the web-content. The one or more traits refer to information that indicates about an essential quality associated with the product. For example, if the product is a pharmaceutical drug 'F' the one or more traits may be indications and/or symptoms that may be associated with the disease for which the pharmaceutical drug 'F' may be prescribed. In such an example, the indications and/or symptoms associated with the pharmaceutical drug 'F' acquired is thereafter store in the data corpus with an appropriate section. In such an example, the appropriate section for storing the side effects associated with the pharmaceutical drug 'F' may be "suggestions" section. In another example, the web-content may include a name of a similar product, namely pharmaceutical drug 'T' as similar product for the pharmaceutical drug 'F'. In such example, pharmaceutical drug 'T' may include one or more traits (such as indications and/or symptoms) associated therein that are similar to the pharmaceutical drug 'F'. In such example, an indication (such as name) of the pharmaceutical drug 'T' may store in the data corpus with an appropriate section.

The processing module is operable to analyze the at least one snippet of text to determine a user perspective related to the product. Throughout the present disclosure, the term "user perspective" relates to an opinion associated to the product, furthermore, the user perspective can include polarity of the opinion and objectivity of the opinion associated with the product. The analysis of the at least one snippet of text includes one or more processes. Optionally, the analysis of the at least one snippet of text can include identifying the phrases and terms in the at least one snippet that are relevant. Furthermore, the identifying of the relevant phrases and terms in the at least one snippet can be performed by one more algorithms and/or methods that, such as tokenization, stemming, removing the Uniform Resource Locator and the likes. The analyzing the at least one snippet of text includes determining one or more phrases and terms that is similar to the identified relevant phrases and terms of the at least one snippet. Optionally, the processing module is operable to access one or more external linguistic corpus for acquiring one or more phrases and terms that is similar to the identified relevant phrases and terms of the at least one snippet. For example, one or more external linguistic corpus may be Wordnet®, Sentiwordnet® and the like.

The at least one snippet of text is a portion of an opinion provided by a user in the form of a comment/review in at least one data source, namely a website, a webpage and the likes. Furthermore, analyzing the at least one snippet of text includes identifying various other information related to the at least one snippet. In an example, the other information may include, date when the review was written, the indication for which the product was used, personal information related to the user providing the review, such as age, gender, span of using the product, and the like, rating provided by the user to define the one or more properties, namely, effectiveness of the product, ease of use of the product, satisfaction associated with the product, description given for the effects and improvements caused due to the use of the product. Optionally, determining the user perspective by the processing module comprises analyzing the at least one snippet of text to identify at least one word used to describe a sentiment of the user associated with the product. The at least one word used to describe a sentiment of the user may be an adjective. In an example, a user perspective related to the product may be "The pharmaceutical drug 'X' for treating headache, www.xyz.com, # bad". In such example, the at least one snippet of text may include the terms drug X, "treating headache" and "bad". In such example, the term describing the sentiment of the user about the product is "bad". Furthermore, analyzing the sentiment of the user associated with the product can include various processes. For example, the various processes may include Creation of Term Document Matrix (TDM), sentence level analysis of the review of the product, aspect based analysis of the sentiment of the product and the likes. Optionally, the word can be terms that are used to represent the product.

The processing module is operable to extract the information related to the product by mapping the at least one dataset associated with the product and the user perspective related to the product. Throughout the present disclosure, the term "mapping" relates to an operation of matching the at least one dataset associated with the product to the user perspective related to the product. The processing module includes an algorithm that can be configured to determine a similarity between the at least one dataset and the user perspective related to the product. For example, a dataset of a pharmaceutical drug 'X' may comprise at least one feature that depicts effects associated with use of the pharmaceutical drug. In such an example, the effects may be a desirable effect of using the pharmaceutical drug, such as, the pharmaceutical drug may be an analgesic that is used for reducing headache. Furthermore, the user perspective related to the pharmaceutical drug 'X' may be a negative sentiment associated with reduction of headache after using the pharmaceutical drug. In such an instance, the algorithm may be configured to map the desirable effect of reducing headache of the pharmaceutical drug 'X' with the negative sentiment of the user associated with use of the pharmaceutical drug 'X'. Moreover, the processing module is configured to extract information related to the pharmaceutical drug 'X' that use of the pharmaceutical drug 'X' for reducing headache is not satisfactory.

The user perspective related to the product is associated the dataset related to the product that provides a set of information about the product that includes terms describing various facts about the product. Thereafter, the set of information is extracted as an output of the system. Optionally, the extracted information comprises the at least one word associated with the product. The at least one word is operable to describe the opinion of the user. Furthermore, the word can be expression used to represent the product. Optionally, the extracted information comprises at least one feature related to the product. The at least one feature related to the product describes the effects of using the product. Optionally, the extracted information comprises sentiment of the user associated with the product. The sentiment of the user associated with the product emotion of the user associated with the using of the product.

The system includes a database arrangement communicably coupled to the processing module, wherein the database arrangement is configured to store the extracted information related to the product. Throughout the present disclosure, the term "database arrangement" as used herein relates to an organized body of digital information regardless of the manner in which the data or the organized body thereof is represented. Optionally, the database arrangement may be hardware, software, firmware and/or any combination thereof. For example, the organized body of related data may be in the form of a table, a map, a grid, a packet, a datagram, a file, a document, a list or in any other form. The database arrangement includes any data storage software and systems, such as, for example, a relational database like IBM DB2 and Oracle 9. Furthermore, the database arrangement refers to the software program for creating and managing one or more databases. Optionally, the database arrangement may be configured to store the extracted information related to the product in a manner that the when accessed the system provides information related to the product that includes terms related to the product, effects of using the product and the user sentiments associated with the product, furthermore, such aforesaid objects of the information are interrelated.

Optionally, the system can be implemented as a data curating system. Furthermore, the system is configured to collect various types of information related to the product, such as specification of the product, reviews provided by users of the product and the likes. Subsequently, the system is operable to process the various types of information collected. Moreover, the system is operable to retain the aforesaid information using appropriate hardware, and addressing various aspects of archiving data, such as creating backups of the data, removing redundancy from the data, indexing the data and the likes.

Furthermore, there is disclosed a computer readable medium containing program instructions for execution on a computer system, which when executed by a computer, cause the computer to perform method steps for extracting information related to a product, the method comprising the steps of receiving web-content aggregated from at least one data source related to a subject matter, wherein the web-content comprises data related to the product associated with the subject matter; analyzing the data to determine at least one snippet of text associated with the product; processing the at least one snippet of text to generate at least one dataset associated with the product, wherein the at least one dataset is stored in a data corpus; analyzing the at least one snippet of text to determine a user perspective related to the product; and extracting the information related to the product by mapping the at least one dataset associated with the product and the user perspective related to the product.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Referring to FIG. 1, illustrated are steps of a method 100 of extracting information related to a product. The method 100 is executable by a processing module. At a step 102, web-content aggregated from at least one data source related to a subject matter is received. The web-content comprises data related to the product associated with the subject matter. At a step 104, the data is analysed to determine at least one snippet of text associated with the product. At a step 106, the at least one snippet of text is processed. The processing of the at least one snippet of text comprises of generating a dataset associated with the product, wherein the at least one dataset is stored in a data corpus. At a step 108, the at least one snippet of text is analysed to determine a user perspective related to the product. At a step 110, the information related to the product is extracted by mapping a dataset extracted from the data corpus and the user perspective related to the product.

The steps 102 to 110 are only illustrative and other alternatives can also be provided where one or more steps are added, one or more steps are removed, or one or more steps are provided in a different sequence without departing from the scope of the claims herein. In an example, the step 106 further comprises generating a data structure comprising at least one record related to the product, wherein the at least one record is arranged within the data structure based on a hierarchy; and generating the data corpus comprising at least one section, by arranging the at least one record within the at least one section. In another example, arranging the at least one record further comprises validating the terms associated with the at least one attribute of the product, with terms acquired from a first external data source, wherein the first external data source comprises standard terms related to the subject matter associated with the product; augmenting the at least one section of the data corpus with at least one feature related to the product acquired from a second external data source; and augmenting at least one section of the data corpus by acquiring at least one trait of the product and a similar product. In yet another example, the step 102 further comprises crawling the at least one data source for receiving the web-content.

In one example, the at least one record comprises terms associated with at least one attribute of the product. In another example, the at least one attribute of the product comprises at least one of a type of the product, a composition of the product, and a nature of use of the product. In yet another example, the at least one section is associated with at least one characteristics of operation of the product, wherein the at least one characteristics of operation of the product comprises at least one of a nature of operation of the product; a nature of effects caused by use of the product; and a condition associated with use of the product.

In an example, the step 108 further comprises analyzing the at least one snippet of text to identify at least one word used to describe a sentiment of the user associated with the product. In another example, the at least one dataset comprises at least one of the terms associated with at least one attribute of the product; the at least one feature related to the product; the at least one trait of the product; and the similar product. In yet another example, the extracted information comprises at least one of the at least one word associated with the product; the at least one feature related to the product; and the sentiment of the user associated with the product.

Figure 2:
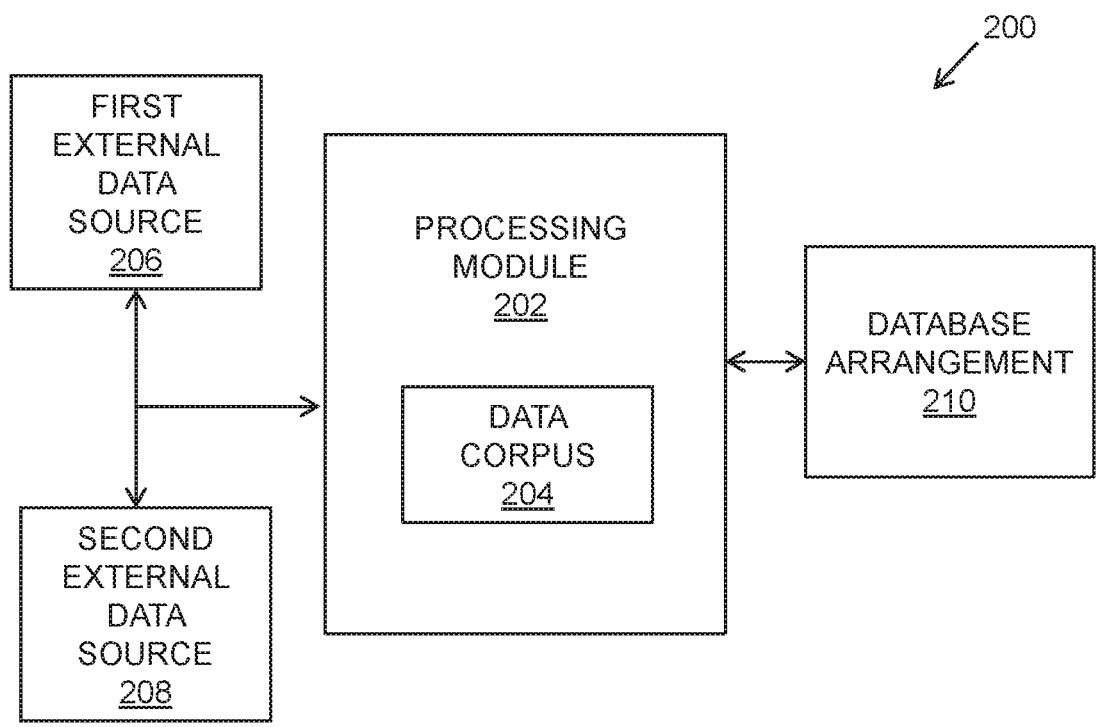
FIG. 2 is a block diagram of a system for extracting information related to a product, in accordance with an exemplary embodiment of the present disclosure.

Referring to FIG. 2, illustrated is a block diagram of a system 200 for extracting information related to a product, in accordance with an embodiment of the present disclosure. The system 200 comprises a processing module 202 operable to receive aggregated web content as input and produce extracted information related to a product as output. Furthermore, the processing module 202 comprises a data corpus 204 operable to store information from first external data source 206 and second external data source 208. The first external data source 206 and second external data source 208 may be web based data sources. Additionally, the processing module 202 is communicably coupled to a database arrangement 210 configured to store the extracted information related to the product.

Figure 3:
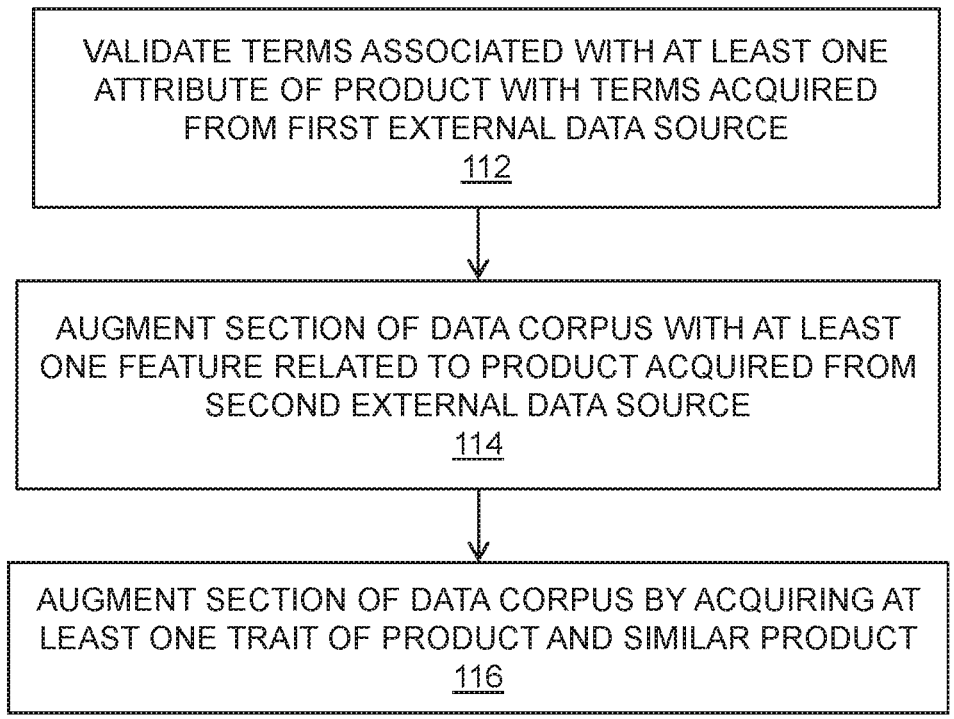
FIG. 3 is an illustration of additional steps of the method of extracting information related to a product, in accordance with an exemplary embodiment of the present disclosure.

Referring to FIG. 3, illustrated are additional steps of the method 100 of extracting information related to a product, in accordance with an exemplary implementation of the present disclosure. At a step 302, the terms associated with the at least one attribute of the product are validated with terms acquired from a first external data source. The first external data source comprises standard terms related to the subject matter associated with the product. At a step 304, the at least one section of the data corpus is augmented with at least one feature related to the product acquired from a second external data source. At a step 306, at least one section of the data corpus is augmented by acquiring at least one trait of the product and a similar product.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A computer implemented method of extracting contextual information related to a product, wherein the method comprises:

receiving web-content aggregated from at least one data source related to a subject matter, wherein the web-content comprises data related to the product, the product being associated with the subject matter;

analyzing the data to determine at least one snippet of text associated with the product, wherein the at least one snippet of text is a portion of an opinion provided by a user;

processing the at least one snippet of text to generate at least one dataset associated with the product, wherein the at least one dataset is stored in a data corpus, wherein the at least one dataset includes at least one of: facts associated with the product, terms describing at least one attribute of the product, at least one feature related to the product, and at least one trait of the product;

analyzing the at least one snippet of text to determine a user perspective related to the product; and extracting the contextual information related to the product by mapping the at least one dataset associated with the product and the user perspective related to the product.

2. The method of claim 1, wherein processing the at least one snippet of text further comprises:

generating a data structure comprising at least one record related to the product, wherein the at least one record is arranged within the data structure based on a hierarchy; and generating the data corpus comprising at least one section, by arranging the at least one record within the at least one section.

3. The method of claim 2, wherein arranging the at least one record further comprises:

validating the terms associated with the at least one attribute of the product, with terms acquired from a first external data source, wherein the first external data source comprises standard terms related to the subject matter associated with the product;

augmenting the at least one section of the data corpus with at least one feature related to the product acquired from a second external data source; and augmenting at least one section of the data corpus by acquiring at least one trait of the product and a similar product.

4. The method of claim 1, wherein receiving the web-content further comprises crawling the at least one data source for receiving the web-content.

5. The method of claim 1, wherein the at least one record comprises terms associated with at least one attribute of the product.

6. The method of claim 5, wherein the at least one attribute of the product comprises at least one of:
a type of the product,
a composition of the product, and
a nature of use of the product.

7. The method of claim 1, wherein the at least one section is associated with at least one characteristics of operation of the product, wherein the at least one characteristics of operation of the product comprises at least one of:
a nature of operation of the product;
a nature of effects caused by use of the product; and
a condition associated with use of the product.

8. The method of claim 1, wherein determining the user perspective comprises analyzing the at least one snippet of text to identify at least one word used to describe a sentiment of the user associated with the product.

9. The method of claim 1, wherein the at least one dataset comprises at least one of:
the terms associated with at least one attribute of the product;
the at least one feature related to the product;
the at least one trait of the product; and
the similar product.

10. The method of claim 1, wherein the extracted information comprises at least one of:
the at least one word associated with the product;
the at least one feature related to the product; and
the sentiment of the user associated with the product.

11. A system for extracting contextual information related to a product, wherein the system comprises:
a processor configured to execute non-transitory machine readable instructions, wherein the processor is configured to:
receive web-content aggregated from at least one data source related to a subject matter, wherein the web-content comprises data related to the product, the product being associated with the subject matter;
analyze the data to determine at least one snippet of text associated with the product, wherein the at least one snippet of text is a portion of an opinion provided by a user;
process the at least one snippet of text to generate at least one dataset associated with the product, wherein the at least one dataset is stored in a data corpus;
analyze the at least one snippet of text to determine a user perspective related to the product; and
extract the contextual information related to the product by mapping the at least one dataset associated with the product and the user perspective related to the product; and
a database arrangement communicably coupled to the processor, wherein the database arrangement is configured to store the extracted contextual information related to the product.

12. The system of claim 11, wherein processing the at least one snippet of text further comprises:
generating a data structure comprising at least one record related to the product, wherein the at least one record is arranged within the data structure based on a hierarchy; and
generating the data corpus comprising at least one section, by arranging the at least one record within the at least one section.

13. The system of claim 12, wherein the arranging the at least one record by the processing module further comprises:
validating the terms associated with the at least one attribute of the product, with terms acquired from a first external data source, wherein the first external data source comprises standard terms related to the subject matter associated with the product;
augmenting the at least one section of the data corpus with at least one feature related to the product acquired from a second external data source; and
augmenting at least one section of the data corpus by acquiring at least one trait of the product and a similar product.

14. The system of claim 11, wherein the receiving web-contents by the processing module further comprises crawling the at least one data source for receiving the web-content.

15. The system of claim 11, wherein the at least one records comprises terms associated with at least one attribute of the product, wherein the at least one attribute of the product comprises at least one of:
a type of the product,
a composition of the product, and
a nature of use of the product.

16. The system of claim 11, wherein the at least one section is associated with at least one characteristics of operation of the product, wherein the at least one characteristics of operation of the product comprises at least one of:
a nature of operation of the product;
a nature of effects caused by use the product; and
a condition associated with use of the product.

17. The system of claim 11, wherein the determining the user perspective by the processing module comprises analyzing the at least one snippet of text to identify at least one words used to describe a sentiment of the user associated with the product.

18. The system of claim 11, wherein the at least one dataset comprises at least one of:
the terms describing at least one attribute of the product;
the at least one feature related to the product;
the at least one trait of the product; and
the similar product.

19. The system of claim 11, wherein the extracted information comprises at least one of:
the at least one word associated with the product;
the at least one feature related to the product; and
the sentiment of the user associated with the product.

20. A computer readable medium containing program instructions for execution on a computer system, which when executed by a computer, cause the computer to perform method steps for extracting contextual information related to a product, the method comprising the steps of:

receiving web-content aggregated from at least one data source related to a subject matter, wherein the web-content comprises data related to the product, the product being associated with the subject matter;

analyzing the data to determine at least one snippet of text associated with the product wherein the at least one snippet of text is a portion of an opinion provided by a user;

processing the at least one snippet of text to generate at least one dataset associated with the product, wherein the at least one dataset is stored in a data corpus, wherein the at least one dataset includes at least one of: facts associated with the product, terms describing at least one attribute of the product, at least one feature related to the product, and at least one trait of the product;

analyzing the at least one snippet of text to determine a user perspective related to the product; and extracting the contextual information related to the product by mapping the at least one dataset associated with the product and the user perspective related to the product.

\* \* \* \* \*